US012776969B2

(12) United States Patent
Sun et al.

(10) Patent No.: US 12,776,969 B2
(45) Date of Patent: Oct. 27, 2026

(54) SYSTEMS AND METHODS FOR NETWORK ATTRIBUTE CHANGE DETECTION

(71) Applicant: NetScout Systems, Inc., Westford, MA (US)

(72) Inventors: Quenie Sun, Dallas, TX (US); Greg Mayo, Salem, NH (US)

(73) Assignee: NetScout Systems, Inc., Westford, MA (US)

(*) Notice: Subject to any disclaimer, the term of this patent is extended or adjusted under 35 U.S.C. 154(b) by 296 days.

(21) Appl. No.: 18/679,247

(22) Filed: May 30, 2024

(65) Prior Publication Data

US 2025/0373526 A1 Dec. 4, 2025

(51) Int. Cl.
*H04L 43/04* (2022.01)
*G06F 16/953* (2019.01)

(52) U.S. Cl.
CPC ............ *H04L 43/04* (2013.01); *G06F 16/953* (2019.01)

(58) Field of Classification Search
None
See application file for complete search history.

(56) References Cited

U.S. PATENT DOCUMENTS

| | | | | |
|---|---|---|---|---|
| 8,719,244 | B1 * | 5/2014 | Pasca | G06F 16/951 707/706 |
| 9,853,876 | B1 * | 12/2017 | Ranjan | H04L 43/10 |
| 10,606,955 | B2 * | 3/2020 | Jayaraman | G06F 16/3329 |
| 11,394,629 | B1 * | 7/2022 | Grilli | G06F 7/08 |
| 2013/0163438 | A1 * | 6/2013 | Wilkinson | H04L 41/5009 370/242 |
| 2015/0200821 | A1 * | 7/2015 | Sade | H04L 67/56 709/224 |
| 2016/0359740 | A1 * | 12/2016 | Parandehgheibi | G06F 9/45558 |
| 2018/0287901 | A1 * | 10/2018 | Bisada | H04L 41/0631 |
| 2021/0336814 | A1 * | 10/2021 | Nandy | H04L 12/1886 |
| 2022/0038454 | A1 * | 2/2022 | Kuarsingh | H04L 63/20 |
| 2022/0368701 | A1 * | 11/2022 | Achleitner | H04L 63/1416 |
| 2023/0274214 | A1 * | 8/2023 | Vangala | G06F 16/90335 705/348 |
| 2024/0126923 | A1 * | 4/2024 | Walters | G06N 3/0455 |
| 2024/0357410 | A1 * | 10/2024 | Trivedi | H04W 28/0215 |
| 2025/0259475 | A1 * | 8/2025 | Wowra | G06V 10/95 |
| 2025/0310280 | A1 * | 10/2025 | D'Agostino | G06Q 40/06 |
| 2025/0337641 | A1 * | 10/2025 | Sumanth | H04W 8/183 |

* cited by examiner

*Primary Examiner* — Jason D Cardone
(74) *Attorney, Agent, or Firm* — Foley & Lardner LLP

(57) ABSTRACT

Systems and methods for network traffic monitoring are provided. A system may retrieve first information of a first data packet exchange including a first plurality of network attributes associated with the first data packet exchange, generate a first embedding vector corresponding to the first plurality of network attributes, identify a second embedding vector of a second data packet exchange based on a correlation between the first embedding vector and the second embedding vector in a vector space, determine that one or more network attributes are included in the first information and absent from second information of the second data packet exchange, and generate an entry in the second database to include the first information and a flag to indicate the determination that the one or more network attributes are included in the first information and absent from the second information.

16 Claims, 8 Drawing Sheets

600

SYSTEMS AND METHODS FOR NETWORK ATTRIBUTE CHANGE DETECTION

BACKGROUND

Devices can communicate over one or more communication networks. Network attributes can include information that pertains to the communication between devices.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
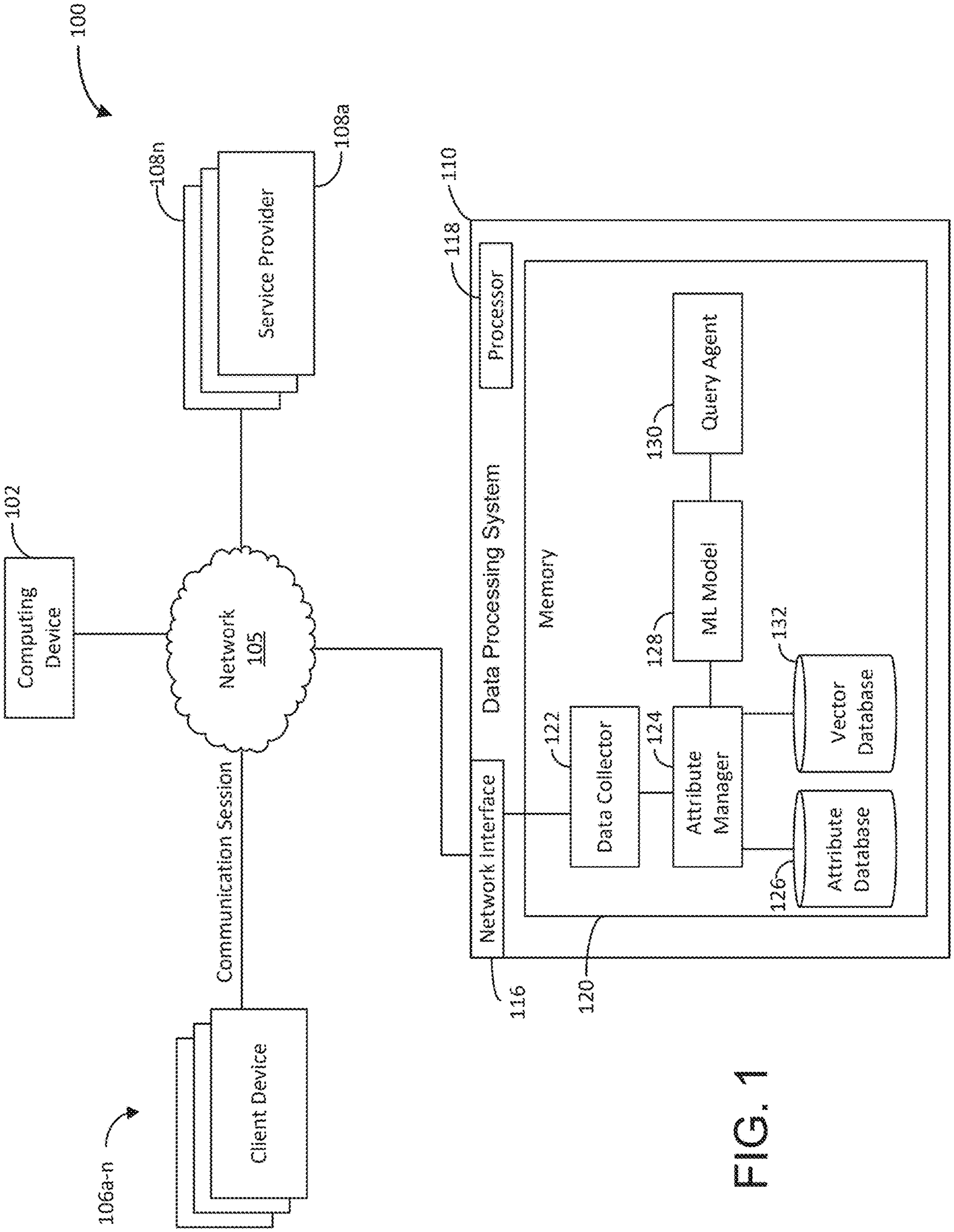
FIG. 1 is an illustration of a system for network attribute analysis, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some systems may employ various techniques for monitoring changes to network attribute combinations. For example, a monitoring system can receive network attributes (e.g., client device ID, server ID, protocol, etc.) as dimension combinations (e.g., a collection and/or a combination of network attributes). A dimension combination can correspond to a particular communication session between two computing devices communicating over a network with a data packet exchange. For instance, a dimension combination can include the network attributes for the communication session. The monitoring system can monitor and store dimension combinations for communication sessions held over the network over time in a database, adding dimension combinations to the database for each communication session that the monitoring system detects. The monitoring system may detect a change in communications on the network based on a detection of a new dimension combination (e.g., a new combination of network attributes). However, given that the network attributes are stored as dimension combinations (e.g., collections and/or combinations), the monitoring system may only be able to detect that the dimension combination is new but may be unable to detect what network attribute changed within the dimension combination or otherwise how the dimension combination differs from the other stored dimension combinations.

To identify an attribute that differs in a new dimension combination from other dimension combinations, for each new dimension combination, the network monitoring system would need to query a database to search for previously detected dimension combinations to compare each network attribute of the new dimension combination with each network attribute of previously detected dimension combinations. This process would be computationally complex and time consuming. For example, if the monitoring system were to detect N new dimension combinations with each dimension combination having M dimensions (e.g., M network attributes), the monitoring system would need to perform N×M queries to determine which network attribute is new for each new dimension combination.

The techniques described herein may overcome the aforementioned technical deficiencies. For instance, a computer may operate to retrieve dimension combinations from a database. The dimension combinations may include a collection of network attributes associated with various data packet exchanges. For example, the computer may retrieve a dimension combination that is associated with a first data packet exchange. The computer may convert the dimension combination to a sentence (e.g., a text string, a collection of characters, etc.). The computer may query a database to check for a match between the sentence and at least one sentence that represents previously detected dimension combinations. In some embodiments, when the computer determines there is not a match (e.g., the sentence represents a new dimension combination), the computer may use a machine learning model to generate an embedding vector to represent the sentence.

The computer may perform various processing techniques on the embedding vector to detect which network attribute is new. For example, the computer may perform nearest neighbor processing within a vector space containing embedding vectors of other data packet exchanges to identify a second embedding vector that is closed to the embedding vector. The computer can retrieve the dimension combination for the second embedding vector from the database based on the identification and compare the dimension combination for the second embedding vector with the dimension combination of the embedding vector. The computer can determine a difference between the dimension combinations, such as by detecting one or more network attributes that are included in the new dimension combination of the embedding vector and that are also absent from a dimension combination that is represented by the second embedding vector.

As an example, the computer may retrieve, from a database, network attributes (e.g., a first dimension combination)

that correspond to a first data packet exchange. For simplicity, in this example, the network attributes may include a client ID (e.g., a first network attribute), a server ID (e.g., a second network attribute), and a protocol used to communicate (e.g., a third network attribute). The computer may convert the network attributes to a sentence and query a database to search for a match. In this example, the computer may generate, responsive to determining there is not a match (e.g., at least one network attribute is new) between each of the network attributes of the first data packet exchange and network attributes of a single other data packet exchange, an embedding vector to represent the network attributes (e.g., the client ID, the server ID, and the protocol). The computer can perform a nearest neighbor analysis between the embedding vector and embedding vectors in a vector space of embeddings generated for other data packet exchanges to identify a second embedding vector that represents a second dimension combination previously observed that is the most similar to the embedding vector for the first data packet exchange. In this example, the second dimension combination may include the first network attribute, the second attribute, and a second protocol used to communicate (e.g., a fourth network attribute). Accordingly, and with respect to this example, the computer may detect that the third attribute (e.g., the protocol used to communicate) is the new network attribute as the third attribute is included in the first dimension combination and is also absent from the second dimension combination.

In some embodiments, network attributes may refer to and/or include information such as, internet protocol (IP) addresses, application IDs, unite resource locators (URLs), network elements, nodes, hypertext transfer protocol secure (HTTPS) addresses, request host ID, application name, domain queries, message name, response code, server name, service name, and/or other possible network attributes that may be exchanged and/or transmitted across a network.

FIG. 1 is an illustration of a system 100 for network attribute analysis, in accordance with an implementation. The system 100 may enable network attribute analysis by detecting variances and/or differences between previously observed dimension combinations and subsequently observed dimension combinations. In brief overview, the system 100 can include, access, or otherwise interface with one or more of a data processing system 110 (e.g., a probe, an inspection device, etc.) that receives and/or stores data packets transmitted via a network 105 between client devices 106*a-n* (hereinafter client device 106 or client devices 106) and service providers 108*a-n*. The service providers 108 can each include a set of one or more servers 602, depicted in FIG. 6A, or a data center 608. The client device 106 may be an example of a user equipment (UE) or another device that can access the network 105. The client device 106 can communicate with the service providers 108 to access a service (e.g., a website, an application, etc.). The client device 106, the service provider 108, a computing device 102, and the data processing system 110 can communicate or interface with one another via the network 105 or directly.

Each of the computing device 102, the client devices 106, the service providers 108, and/or the data processing system 110 can include or utilize at least one processing unit or other logic device such as programmable logic array engine, or module configured to communicate with one another or other resources or databases. The components of the computing device 102, the client devices 106, the service providers 108, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The computing device 102, the client devices 106, the service providers 108, and/or the data processing system 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be a service provider that hosts different services or applications that can be accessed by computing devices, such as the computing device 102 and/or the client devices 106. The service provider 108 can be hosted by a third-party cloud service provider via a virtual environment, in some embodiments. The service provider 108 can be hosted in a public cloud, a co-location facility, or a private cloud, for example. The service provider 108 can be hosted in a private data center, or on one or more physical servers, virtual machines, or containers of an entity or customer. The service providers 108 may each be or include servers or computers configured to transmit or provide services across the network 105 to the client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data, or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 610 depicted in FIG. 6B.

The client device 106 can establish communication sessions with the service providers 108 to receive data from the service providers 108. For example, a user associated with the client device 106 may request a service. Responsive to the request, a service provider 108 associated with the service may send requested data to the client device 106 in a communication session. In some cases, the request may be a bad request. For example, the request may be a nonexistent DNS query. The client devices 106 may establish communication sessions with the service providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 610 on the same computing host in an infrastructure 616 (described below with respect to FIG. 6B).

The data processing system 110 may comprise one or more processors that are configured to obtain network data packets from the service providers 108 during a communication session between the client device 106 and the service providers 108. In some embodiments, the data processing system 110 may refer to and/or include a network monitoring device. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, an attribute manager 124, an attribute database 126, a machine learning (ML) model 128, a query agent 130, and/or a vector database 132. The data processing system 110 may further include other components, managers, handlers, etc. to perform the techniques as described herein. In brief overview, the components 122-130 may obtain a network data packet associated with a communication session between the client device 106 and a network service provider (e.g., the service providers 108). The components 122-130 may determine whether the network data packet includes characteristics and/or information indicative of a new or previously unobserved network attribute or dimension combination.

The data collector 122 may comprise programmable instructions that, upon execution, cause the processor 118 to monitor one or more data packet exchanges. For example, the data collector 122 may monitor exchanges between the client device 106 and the service provider 108. In some embodiments, a client may refer to a computer with a first IP address that initiates a session (e.g., a flow, communication, exchange, etc.) with a second computer having a second IP address.

The data collector 122 may obtain (e.g., receive, collect) data transmitted between the client devices 106 and the service providers 108 as part of a communication session. For example, the client device 106 may send a request for a service to the service provider 108. The service provider 108 may send a response to provide the service to the client device 106. The data collector 122 may receive the request from the service provider 108. The request may be associated with a normal request for the service, or the request may be associated with a malicious attack.

In some embodiments, the data collector 122 may collect information that pertains to the data packet exchanges. For example, the data collector 122 may collect information that includes and/or identifies network attributes associated with the respective data packet exchanges. The data collector 122 may collect information such as, host name, client name, communication protocol, etc. In some embodiments, the data collector 122 may store and/or forward the information to the attribute database 126. For example, the data collector 122 may store the network attributes and/or dimension combinations in the attribute database 126. In some embodiments, the data collector 122 may store the information in various formats. For example, the data collector 122 may perform a scraping process (e.g., a data mining and/or data extraction process) to retrieve and/or extract the dimension combinations from the data packet exchanges. The dimension combinations may be in C code or programming language code and the data collector 122 may store the dimension combinations in the retrieved format (e.g., C code, programming language code, etc.).

In some embodiments, the attribute database 126 may store information retrieved and/or collected by the data collector 122. For example, the attribute database 126 may store the dimension combinations collected by the data collector 122. In some embodiments, the vector database 132 may store and/or maintain a vector database or a vector space. For example, the vector database 132 may store vectors and/or embedding vectors generated by the ML model 128. As another example, the vector database 132 may store textual sentences generated by the ML model 128.

In some embodiments, the ML model 128 may refer to and/or include one or more machine learning models and/or model types. For example, the ML model 128 may include at least one large language model (LLM). As another example, the ML model 128 may include deep neural networks, regression models, and/or linear regression models. In some embodiments, the ML model 128 may be trained and/or finetuned by at least one of supervised learning, unsupervised learning, reinforcement learning, linear regression training, clustering, and/or other possible techniques.

In some embodiments, the data collector 122 may continuously, semi-continuously, sequentially, repeatedly, and/or otherwise routinely collect dimension combinations and/or network attributes. As the data collector 122 collects information (e.g., dimension combinations, network attributes, etc.), the data collector 122 may store or forward the information to the attribute database 126 to create a collection of dimension combinations observed across the network 105.

The attribute manager 124 may comprise programmable instructions that, upon execution, cause the processor 118 to retrieve information from one or more databases. For example, the attribute manager 124 may retrieve information from the attribute database 126. In some embodiments, the attribute manager 124 may retrieve dimension combinations and/or network attributes collected, obtained, and/or extracted by the data collector 122. For example, the attribute manager 124 may query and/or prompt the attribute database 126 for information. In some embodiments, the attribute manager 124 may retrieve the information from the attribute database 126 via one or more application programming interface (API) calls. For example, the attribute manager 124 may transmit an API request to the attribute database 126 and the attribute manager 124 may receive information, via one or more API responses, from the attribute database 126.

In some embodiments, the attribute manager 124 may implement, control, execute, and/or otherwise utilize the ML model 128. For example, the attribute manager 124 may provide one or more prompts and/or inputs to the ML model 128 to cause the ML model 128 to provide one or more outputs. As another example, the attribute manager 124 may utilize the ML model 128 to generate one or more embedding vectors. In other embodiments, at least one of the components described herein may implement, utilize, and/or control the ML model 128. In some embodiments, the attribute manager 124 may provide dimension combinations and/or network attributes as inputs to the ML model 128. For example, the ML model 128 may produce and/or output one or more vectors (e.g., embedding vectors, tokens, etc.) based on the inputs provided by the attribute manager 124. As another example, the ML model 128 may produce and/or output a textual sentence that represents or indicates dimension combinations provided by the attribute manager 124.

In some embodiments, the attribute manager 124 may store and/or forward the outputs of the ML model 128 (e.g., vectors, textual sentences, etc.) to the vector database 132. For example, the vector database 132 may represent a vector space and the vector space can store vectors generated by the ML model 128. In some embodiments, the attribute manager 124 may coordinate and/or orchestrate operations with operations of the query agent 130 to determine when to update the vector database 132. For example, the attribute manager 124 may continuously update the vector database 132 for a predetermined amount of time. After the predetermined amount of time has elapsed, the attribute manager 124 may communicate with the query agent 130 to determine when to update the vector database 132.

The query agent 130 may comprise programmable instructions that, upon execution, cause the processor 118 to query and/or search one or more databases. For example, the query agent 130 may search the vector database 132 to check for matches between previously observed dimension combinations and subsequently collected dimension combinations. For example, the query agent 130 may compare dimension combinations stored in the attribute database 126 with dimension combinations stored in the vector database 126. The query agent 130 may determine that dimension combinations, stored in the attribute database 126, are not new dimension combinations responsive to detecting a match with a dimension combination stored in the vector database 132. Stated otherwise, the query agent 130 may determine that a dimension combination is not new responsive to the dimension combination being found in both the attribute database 126 and the vector database 132.

In some embodiments, the query agent 130 may determine differences between the dimension combinations (e.g., a dimension combination stored in the attribute database 126 does not match any dimension combination stored in the vector database 132). For example, the query agent 130 may determine that a dimension combination, stored in the attribute database 126, is not stored in the vector database 132 (e.g., the dimension combination is new). In some embodiments, the query agent 130 may forward and/or indicate the new dimension combination to the attribute manager 124. The attribute manager 124 may provide the new dimension combination as an input to the ML model 128 and execute the ML model 128 (e.g., using the new dimension combination as input). The ML model 128 can generate an embedding vector for the new dimension combination, such based on an output of an embedding layer of the ML model 128. The attribute manager 124 can update the vector database 132 to include the embedding vector that represents the new dimension combination.

In some embodiments, the attribute manager 124 may execute and/or implement various processes to evaluate the new dimension combinations. For example, the attribute manager 124 may perform nearest neighbor evaluation between vectors in the vector database 132 and the new dimension combination to identify a given vector that is closest (e.g., nearest, most similar, etc.) to the new dimension combination. The attribute manager 124 can identify a sentence or data entry in the vector database 132 that corresponds to the vector determined as being closest to the new dimension combination. The attribute manager 124 can compare the dimensions of the new dimension combination with the dimensions of the identified sentence or data entry to identify differences between the new dimension combination and the dimensions of the identified sentence or data entry. The differences can be new dimensions or attributes.

In some embodiments, the data processing system 110 may generate and/or produce one or more alerts to provide indications of the new dimension combination and/or new dimensions or attributes of the new dimension combination. For example, the data processing system 110 may transmit a message to the computing device 102 to cause the computing device to display a user interface identifying the new dimension combination or new attributes or dimensions of the new dimension combination. As another example, the data processing system 110 may transmit a message that causes a user interface to be generated that indicates and/or identifies the new dimension combination or new attributes or dimensions of the new dimension combination.

Figure 2:
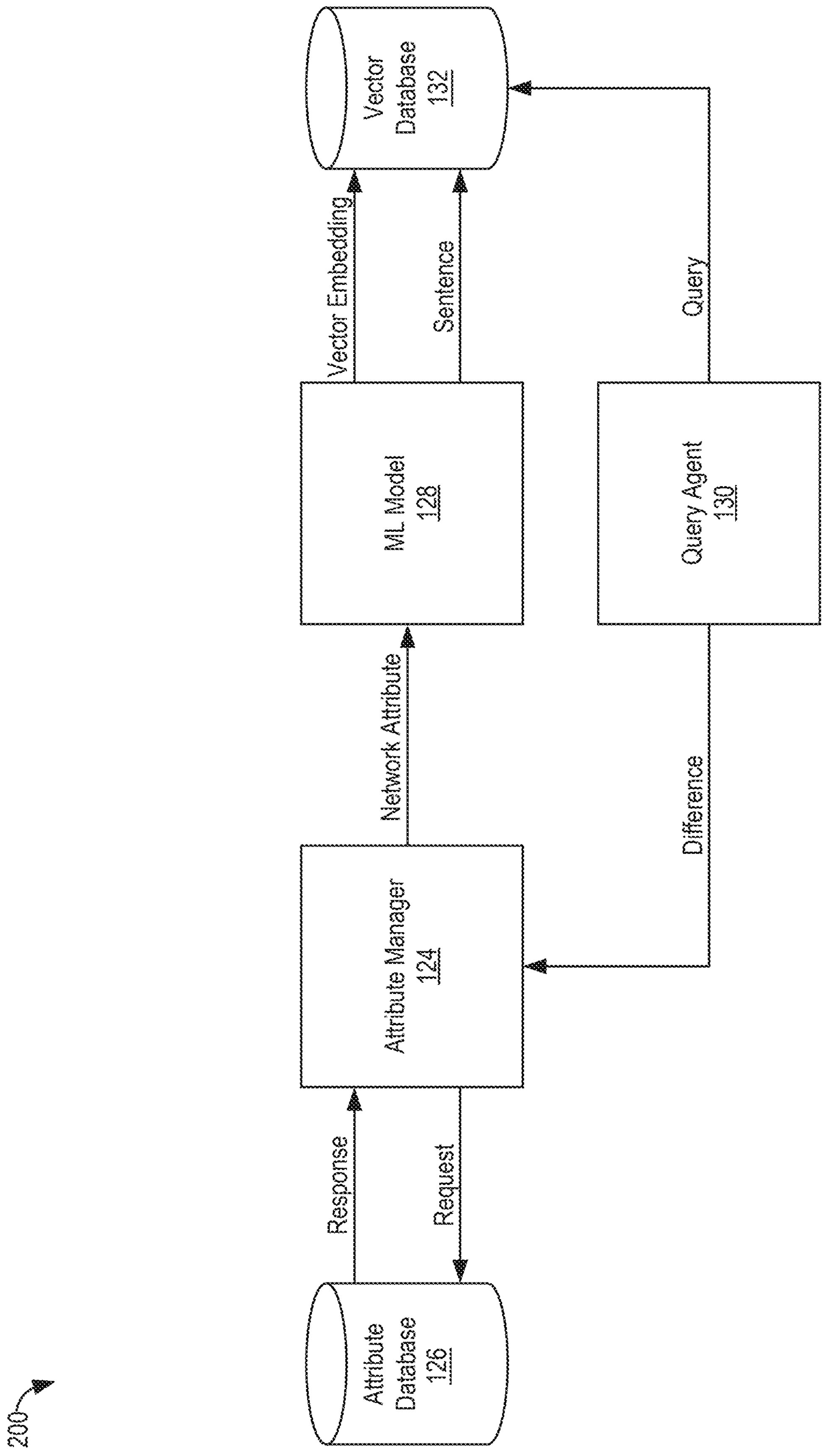
FIG. 2 is an illustration of a system that includes one or more components of the system illustrated in FIG. 1, in accordance with an implementation.

FIG. 2 is an illustration of a system 200 for network attribute analysis, in accordance with an implementation. In some embodiments, the system 200 may refer to and/or include the system 100 and/or one or more components thereof. For example, the system 200 is shown to include the attribute manager 124, the ML model 128, the query agent 130, the attribute database 126, and the vector database 132.

In some embodiments, the attribute manager 124 may retrieve information that corresponds to one or more data packet exchanges. For example, the attribute manager 124 may retrieve dimension combinations and/or network attributes from the attribute database 126. In some embodiments, the attribute manager 124 may provide one or more requests (e.g., API calls, prompts, etc.) to the attribute database 126. For example, the attribute manager 124 may provide a request to the attribute database 126 (e.g., query the attribute database 126) for network attributes that were provided by the data collector 122 within a given amount of time (e.g., provided within the last 15 minutes, the last hour, the last day, etc.). The attribute database 126 can provide one or more responses to the attribute manager 124. For example, the attribute database 126 can return and/or provided the network attributes to the attribute manager 124.

In some embodiments, the attribute manager 124 may convert the network attributes into a text string (e.g., textual sentences). For example, the attribute manager 124 may provide the network attributes as inputs to the ML model 128. The ML model 128 can output and/or provide text strings that represent the network attributes inputted into the ML model 128. For example, the ML model 128 can receive, as inputs, programing language code or disparate data points (e.g., a first format) that represent the network attributes and the ML model 128 can output the network attributes as at least one of a text string, a textual sentence, a sentence (e.g., one or more second formats). In some embodiments, the attribute manager 124 and/or ML model 128 may store the text strings to the vector database 132 and/or the query agent 130. The ML model 128 may convert the network attributes into text strings based on one or more templates. For example, the ML model 128 may utilize and/or execute one or more functions, commands, statements, routines, and/or calls to convert the network attributes into text strings according to a template identifying locations in the sentence to place specific types of network attributes.

In some embodiments, the query agent 130 may query the vector database 132. For example, the query agent 130 may query the vector database 132 to search for matches between sentences, provided by the attribute manager 124, and sentences stored in the vector database 132. In some embodiments, a match exists when a textual sentence provided to the query agent 130 is the same as a textual sentence stored in the vector database 132 (e.g., same information, same dimension combination, same network attributes, etc.). Stated otherwise, a match exists when a dimension combination provided to the query agent 130 was previously observed across the network 105.

In some embodiments, the query agent 130 may forward and/or indicate given sentences and/or text strings without matches (e.g., new dimension combinations). For example, the query agent 130 may return one or more sentences to the attribute manager 124 responsive to a determination that the one or more sentences are not located in the vector database 132. In some embodiments, the query agent 130 may provide the sentences that correspond to new dimension combinations (e.g., no matches in the vector database 132) to the ML model 128. The ML model 128 may generate and/or output one or more embedding vectors based on the sentences provided as inputs. In some embodiments, the embedding vectors may correspond to and/or represent one or more network attributes.

In some embodiments, the query agent 130 and/or the ML model 128 may perform one or more techniques to check for matches and/or correlations between embedding vectors, stored in the vector database 132, and embedding vectors that represent dimension combinations that did not have any matches in the vector database 132. For example, the ML model 128 may implement nearest neighbor analysis to identify one or more embedding vectors that are closest to and/or similar to the dimension combinations that did not have any matches in the vector database 132.

In some embodiments, the query agent 130 may identify a second embedding vector based on a correlation between a first embedding vector and the second embedding vector in a vector space. For example, the query agent 130 may identify the second data embedding vector based on the second embedding vector being closest to (e.g., nearest neighbor) to the first embedding vector. The first embedding vector may represent an embedding vector that corresponds to a dimension combination that does not have matches in the vector database. The second embedding vector may represent an embedding vector that corresponds to previously observed dimension combinations and/or network attributes and that is stored in the vector database 132 and/or the attribute database 126.

In some embodiments, the query agent 130 may determine one or more network attributes that are different between the first embedding vector and the second embedding vector. For example, the query agent 130 may identify one or more network attributes, represented by the first embedding vector that are absent from the second embedding vector. The query agent 130 may identify the one or more network attributes by detecting network attributes that are represented by the first embedding vector and that are not represented by the second embedding vector. Stated otherwise, the query agent 130 may identify the one or more network attributes by comparing the embedding vectors (e.g., the first embedding vector and the second embedding vector) to detect differences (e.g., different network attributes). In some embodiments, network attributes included in and/or represented by the first embedding vector that are also absent from the second embedding vector may represent new network attributes.

In some embodiments, the query agent 130 may forward and/or indicate one or more differences to the attribute manager 124. For example, the query agent 130 may identify which network attributes are different than the embedding vectors included in the vector database 132. In some embodiments, the attribute manager 124 may generate one or more entries in the vector database 132. For example, the attribute manager 124 may forward the new network attributes (e.g., the network attributes identified by the query agent 130) to vector database 132 to cause the vector database 132 to update a list that include new network attributes. In some embodiments, the entries may include flags to indicate that the network attributes are new network attributes.

In some embodiments, the attribute manager 124 may generate and/or update one or more lists to include network attributes determined as new. For example, the attribute manager 124 may add network attributes that were absent from the vector space (e.g., the vector database 132) to the lists. As another example, the attribute manager 124 may update the lists to include the flags included in the entries. In some embodiments, the attribute manager 124 may forward and/or provide the lists to a computing device. For example, the attribute manager 124 may forward the list to the computing device 102, either automatically (e.g., as an alert) or in response to a request from the computing device 102.

Figure 3:
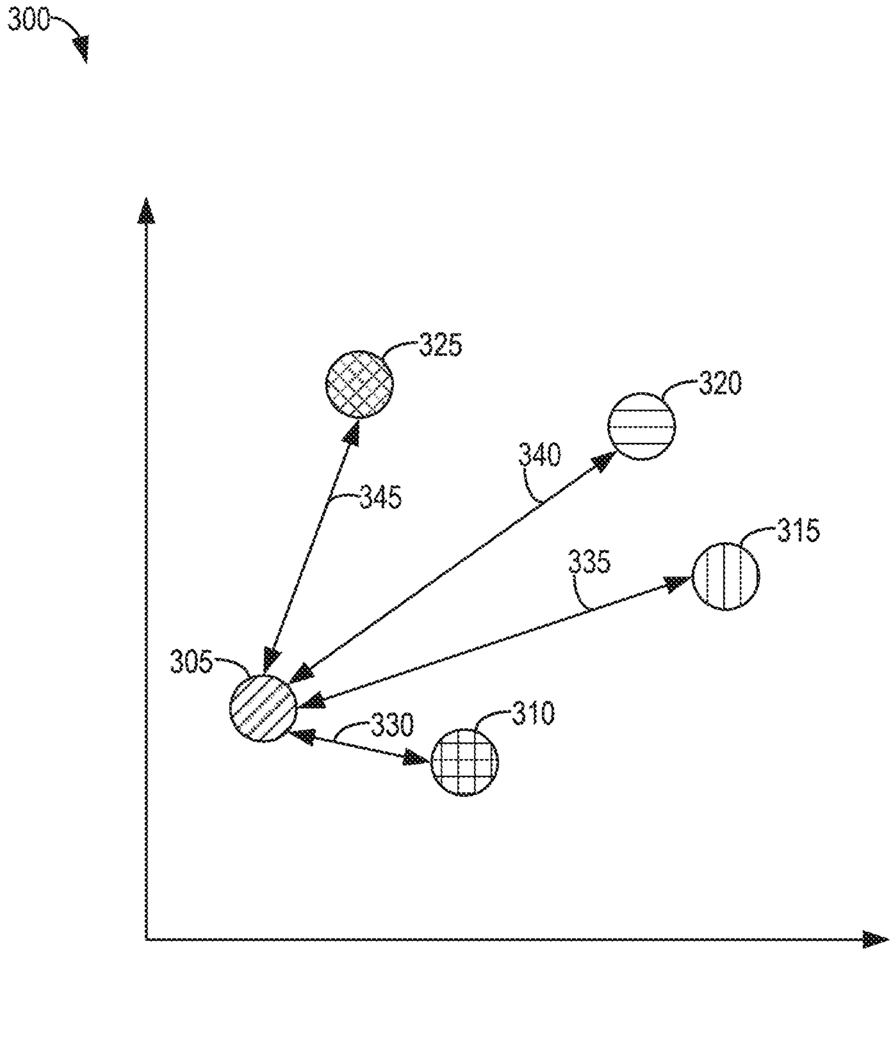
FIG. 3 is an illustration of a vector space that includes embedding vectors, in accordance with an implementation.

FIG. 3 is an illustration of a vector space 300, in accordance with an implementation. In some embodiments, the vector database 132 may store, keep, maintain, and/or otherwise manage the vector space 300. The ML model 128 may generate the vector space 300 and/or one or more entries (e.g., embedding vectors, sentences, text strings, etc.) of the vector space 300. As shown in FIG. 3, the vector space 300 includes embedding vectors 305, 310, 315, 320, and 325. Each embedding vector may refer to and/or represent one or more network attributes and/or dimension combinations. For example, embedding vector 305 may represent a first dimension combination (e.g., a collection of network attributes) and embedding vector 310 may represent a second dimension combination.

As shown in FIG. 3, the embedding vector 305 and the embedding vector 310 may be separated by a distance 330, the embedding vector 305 and the embedding vector 315 may be separated by distance 335, the embedding vector 305 and the embedding vector 320 may be separated by distance 340, and the embedding vector 305 and the embedding vector 325 may be separated by distance 345. In some embodiments, the query agent 130 may determine correlations (e.g., similarities) between the embedding vectors based on distances between the embedding vectors. For example, a first embedding vector is more correlated to a second embedding vector instead of a third embedding vector based on a distance between the first embedding vector and the second embedding vector being less than a distance between the first embedding vector and the third embedding vector.

In some embodiments, the embedding vector 310 may be a nearest neighbor (e.g., closest) to the embedding vector 305. For example, the embedding vector 310 and the embedding vector 305 may have the most similar network attributes. In some embodiments, the query agent 130 may identify one or more new network attributes by detecting one or more network attributes, represented by the embedding vector 305, that are absent from the embedding vector 310. In some embodiments, the query agent 130 may determine the distances between the embedding vectors. For example, the query agent 130 may determine the distance 330. In some embodiments, the query agent 130 may determine the distances by comparing the embedding vectors to detect differences and/or similarities. For example, the embedding vectors may represent one or more points within the vector space 300. The query agent 300 may determine the distances based on differences between the points of the embedding vectors.

Figure 4:
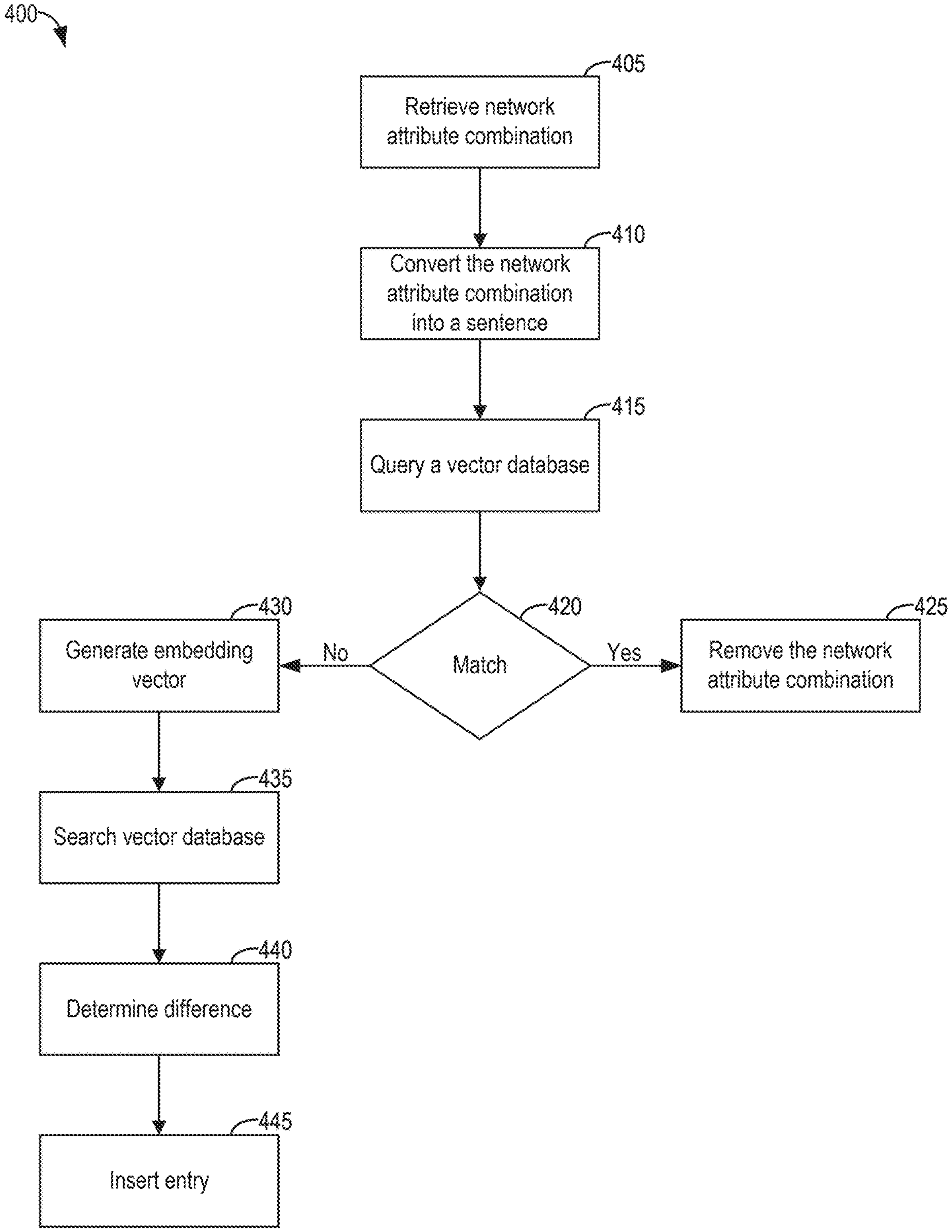
FIG. 4 is an illustration of a flow diagram of a process for network attribute analysis, in accordance with an implementation.

FIG. 4 is an illustration of a flow diagram of a process 400 for network attribute analysis, in accordance with an implementation. The process 400 can be performed by a data processing system (the data processing system 110, shown and described with reference to FIG. 1). The process 400 may include more or fewer operations and the operations may be performed in any order. Performance of the process 400 may enable the data processing system to detect new and/or previously unobserved network attributes across a network.

At operation 405, the data processing system retrieves network attribute combinations. For example, the data processing system can retrieve information that represents network attributes and/or dimension combinations from the attribute database 126. The data processing system can retrieve the information via one or more API calls and/or requests. The data processing system can retrieve the information in one or more formats. For example, the data processing system can retrieve the information as programing language code. As another example, the data processing system can retrieve the information in a format that corresponds to one or more data packet exchanges.

At operation 410, the data processing system converts the network attribute combinations into a sentence. For example, the data processing system may implement and/or utilize the ML model 128 to convert the network attribute combinations from programming language code to text strings (e.g., sentences). The ML model 128 may execute and/or utilize one or more commands and/or functions to convert the network attribute combinations.

At operation 415, the data processing system queries a vector database. For example, the data processing system may query the vector database 132 to check for matches between the sentences, generated in operation 410, and one or more sentences stored in the vector database 132. In some embodiments, the data processing system may implement and/or utilize the ML model 128 to query the vector database 132.

At operation 420, the data processing system determines whether the queries in operation 415 returned any matches. For example, the data processing system may determine that a sentence stored in the vector database 132 matched the sentence converted in operation 410. As another example, the data processing system may determine that the vector database 132 did not include any sentences that matched the sentenced converted in operation 410. The process 400 can proceed to operation 425 responsive to a determination that there was a match between the sentence converted in operation 410 and one or more sentences stored in the vector database 132. The process 400 can proceed to operation 430 responsive to a determination that there was not a match between the sentence converted in operation 410 and one or more sentences stored in the vector database 132. By determining whether the sentence matched any sentences in the vector database 132 prior to converting the sentence to a vector embedding using the ML model 128, the data processing system can reduce the processing resources that are required to perform the method 400 because the data processing system would not use processing resources to execute the ML model 128 for every sentence, but only sentences that include new dimensions or values. The reduction in processing resources can be large because executing the ML model 128 can require a substantial amount of resources for each execution, so executing the ML model 128 for every sentence that the data processing system generates would incur a significant amount of computing resources and latency in updating the vector database 132 as the data processing system receives data packets from hundreds of thousands of data packet exchanges.

At operation 425, the data processing system removes the network attribute combination. For example, the data processing system can remove the network attribute combination that was converted in operation 410 from the vector database 132. As another example, the data processing system may prevent the storage of the network attribute combination in the vector database 132 responsive to the vector database 132 already including a sentence that represents the network attribute (e.g., there was a match).

At operation 430, the data processing system generates an embedding vector. For example, the data processing system can generate an embedding vector of the sentenced converted in operation 410. As another example, the data processing system can generate an embedding vector for one or more sentences that did not match sentences stored in the vector database 132. In some embodiments, the data processing system may utilize and/or implement the ML model 128 to generate the embedding vectors. For example, the data processing system may provide the sentences as inputs to the ML model 128 and the ML model 128 can provide the embedding vectors as outputs.

At operation 435, the data processing system searches the vector database. For example, the data processing system may search the vector space 300 for one or more embedding vectors. In some embodiments, the data processing system may search the vector space 300 to retrieve information that corresponds to the embedding vectors. For example, the data processing system may search the vector space 300 to retrieve one or more network attributes, network attribute combinations, and/or dimension combinations represented by the embedding vectors.

At operation 440, the data processing system determines a difference. For example, the data processing system may determine differences between the embedding vectors, generated in operation 430, and/or more embedding vectors stored in the vector space 300 based on distances between the embedding vectors. The data processing system may determine one or more network attributes that are represented in a first embedding vector and absent from a second embedding vector (e.g., one or more differences). The data processing system may determine the differences responsive to determining that the first embedding vector and the second embedding vector are nearest neighbors. For example, the data processing system may compare the network attributes represented by two embedding vectors responsive to determining that the two embedding vectors are nearest neighbors.

At operation 445, the data processing system inserts an entry. For example, the data processing system may insert an embedding vector (e.g., an entry) into the vector database 132. As another example, the data processing system may insert the embedding vector into the vector space 300. In some embodiments, the data processing system may insert the entries to represent the new network attributes (e.g., the differences determined in operation 440) in the vector space 300. For example, the data processing system may insert an entry to represent one or more network attributes in the vector space 300.

Figure 5:
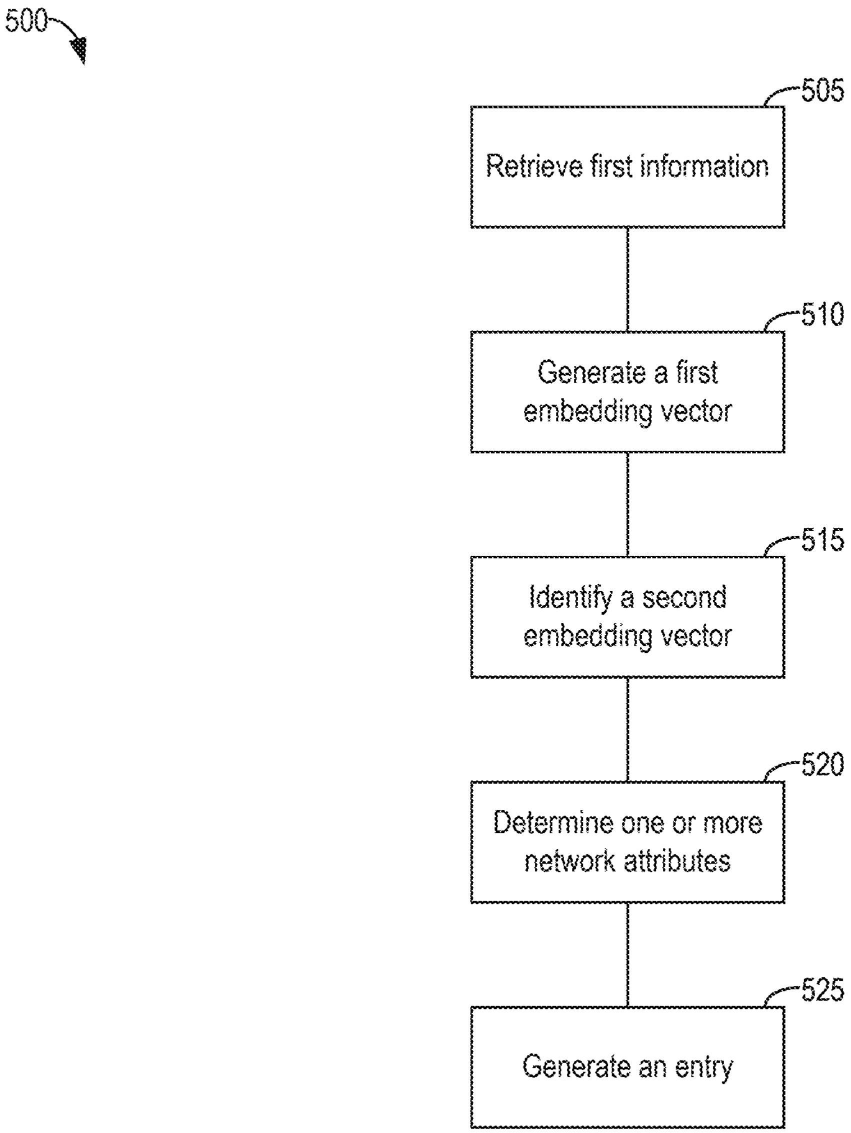
FIG. 5 is an illustration of a flow diagram of a method for network attribute analysis, in accordance with an implementation.

FIG. 5 is an illustration of a flow diagram of a method 500 for network attribute analysis, in accordance with an implementation. The method 500 can be performed by one or more systems, components, or modules depicted in FIGS. 1-2 and/or 6A-6C, including, for example, a data processing system or service of a cloud service provider system. The method 500 may include more or fewer operations and the operations may be performed in any order. Performance of the method 500 may enable the data processing system to determine one or more new network attributes and/or network attribute combinations.

At operation 505, the data processing system retrieves first information. For example, the data processing system may retrieve the first information responsive to transmitting one or more requests to the attribute database 126. In some embodiments, the first information may refer to and/or indicate one or more network attributes collected by the data collector 122. For example, the first information may indicate network attributes associated with data packet exchanges between the client device 106 and the service provided 108.

In some embodiments, the first information may be in a given format. For example, the first information may be in programming language code. As another example, the data collector 122 may perform a scrap function to collect the network attributes and the first information may be in a given format that corresponds to the scrap function. The data processing system may determine a format of the first information responsive to retrieval of the first information.

At operation 510, the data processing system generates a first embedding vector. For example, the data processing system may provide the first information, retrieved in operation 505, as an input to the ML model 128 to cause the ML model 128 to output (e.g., generate) the first embedding vector. In some embodiments, the data processing system may convert and/or modify the first information prior to and/or after the generation of the first embedding vector. For example, the data processing system may convert the first information into a sentence. The data processing system may provide the sentence as an input to the ML model 128.

At operation 515, the data processing system identifies a second embedding vector. For example, the data processing system may identify the second embedding vector based on the second embedding vector being a nearest neighbor to the first embedding vector. As another example, the data processing system may identify the second embedding vector based on one or more correlations between the first embedding vector and the second embedding vector. In some embodiments, the data processing system may identify the second embedding vector by determining that a difference (e.g., a distance) between one or more points of the first embedding vector and the second embedding vector is less than differences between the first embedding vector and any third embedding vector.

At operation 520, the data processing system determines one or more network attributes. For example, the data processing system may determine one or more network attributes included in and/or represented by the first embedding vector. The data processing system may determine the one or more network attributes responsive to detecting that the one or more network attributes are included in the first embedding vector and are absent from the second embedding vector. In some embodiments, the one or more network attributes included in the first embedding vector and absent from the second embedding vector may refer to and/or include new network attributes (e.g., previously unobserved network attributes).

At operation 525, the data processing system generates an entry. For example, the data processing system may generate an entry to add to the vector database 132. In some embodiments, the entry may represent and/or indicate the one or more network attributes determined in operation 520. For example, the data processing system may generate the entry by adding the sentence that represents the one or more network attributes and/or the first embedding vector into the vector database 132. As another example, the data processing system may generate an entry that includes the first information retrieved in operation 505. The entry may include one or more tags. For example, the entry may include a tag to indicate that the first information included one or more network attributes that were different that network attributes represented in the vector database 132.

Figure 6A:
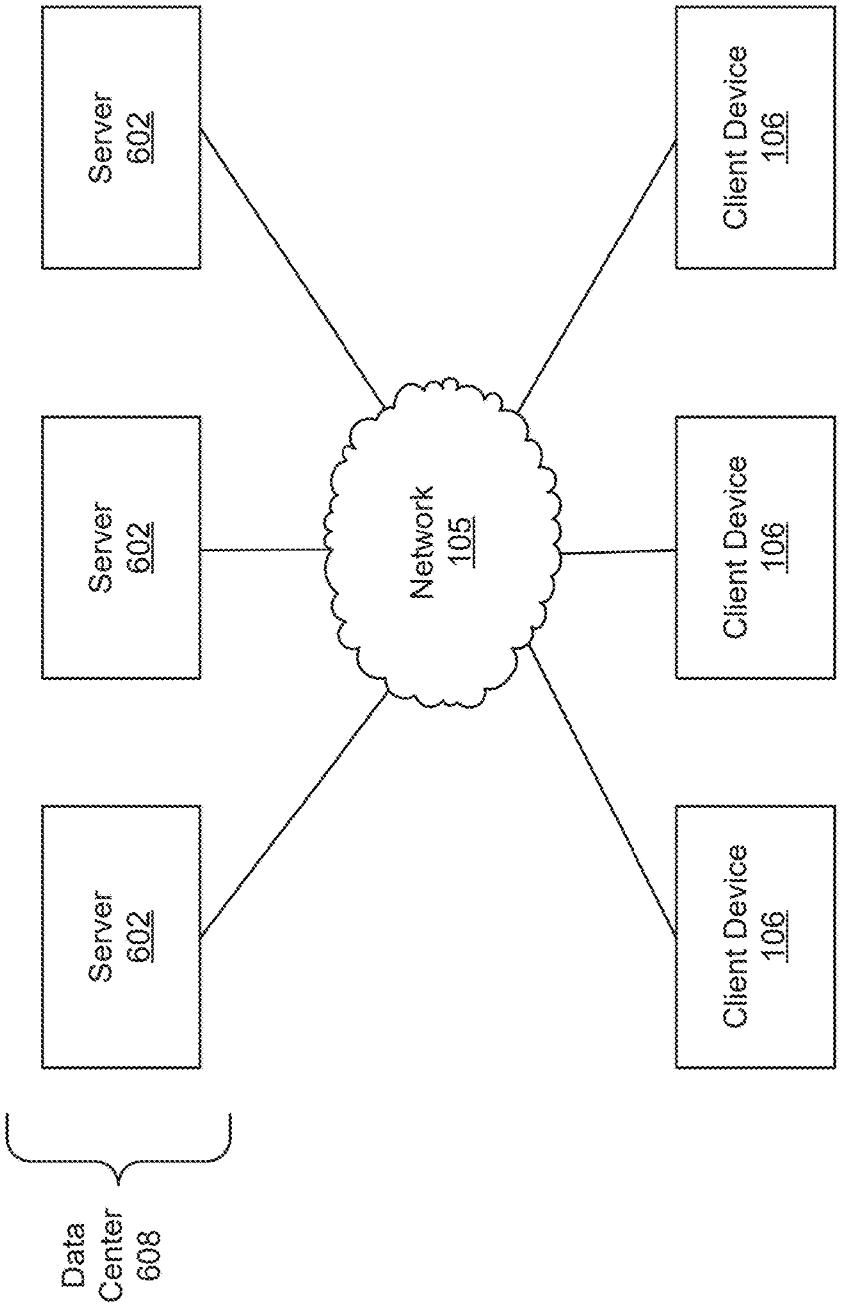
FIG. 6A is a block diagram depicting an implementation of a network environment including a client device in communication with a server device, in accordance with an implementation.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems, and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
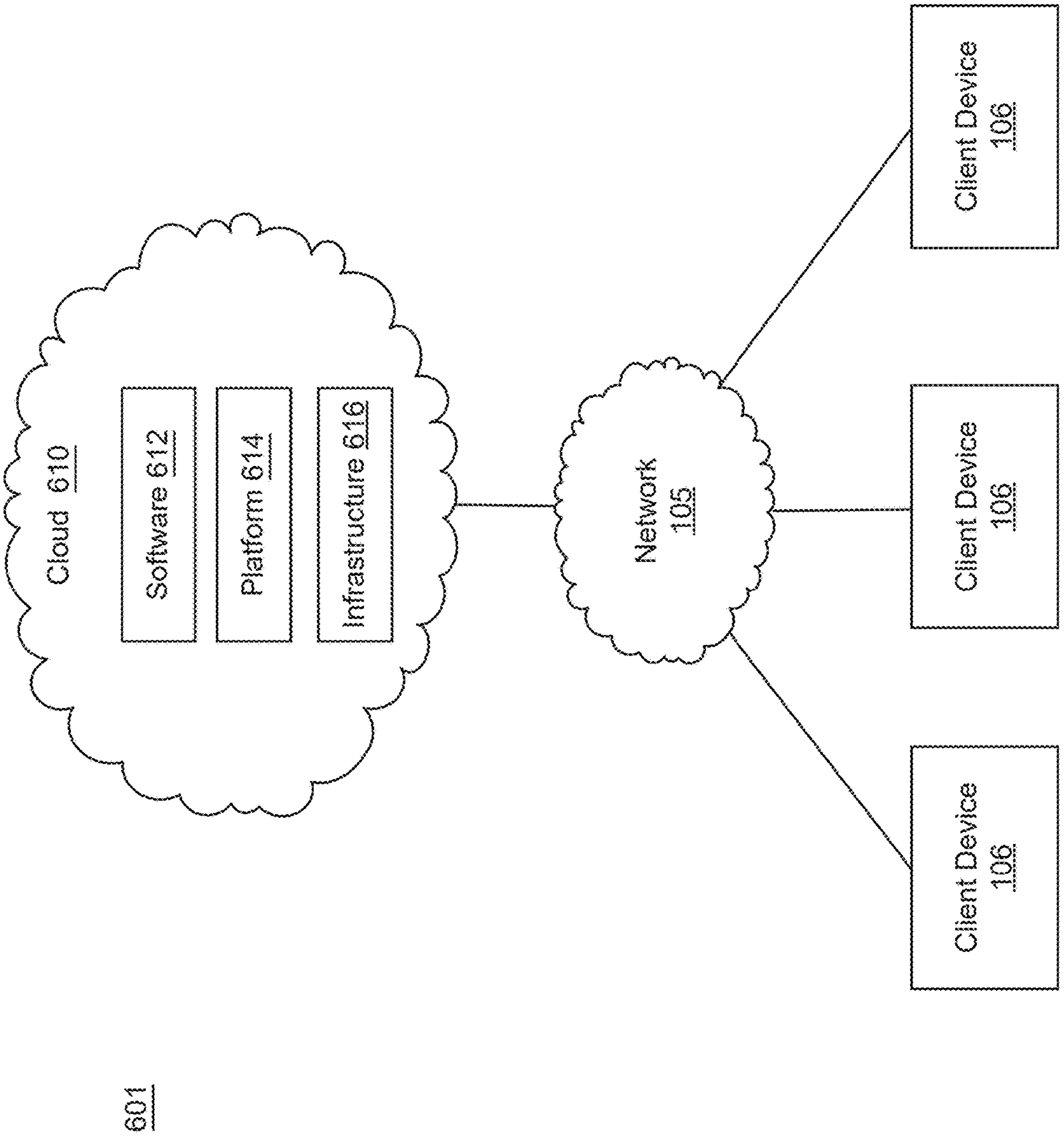
FIG. 6B is a block diagram depicting a cloud computing environment including a client device in communication with cloud service providers, in accordance with an implementation.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back-end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds can include both the private and public networks 105 and servers 602.

The cloud 610 can also include a cloud-based delivery, e.g., Software as a Service (Saas) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers, or virtualization resources from large pools, allowing the users to quickly scale up by accessing more resources as needed. PaaS providers can offer functionality provided by IaaS, including, e.g., storage, networking, servers, or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL), DTLS (Datagram Transport Layer Security), or other transmission mechanisms.

The client 106 and server 602 can be deployed as and/or executed on any type and form of computing device, e.g., a computer, network device or appliance capable of communicating on any type and form of network and performing the operations described herein.

Figure 6C:
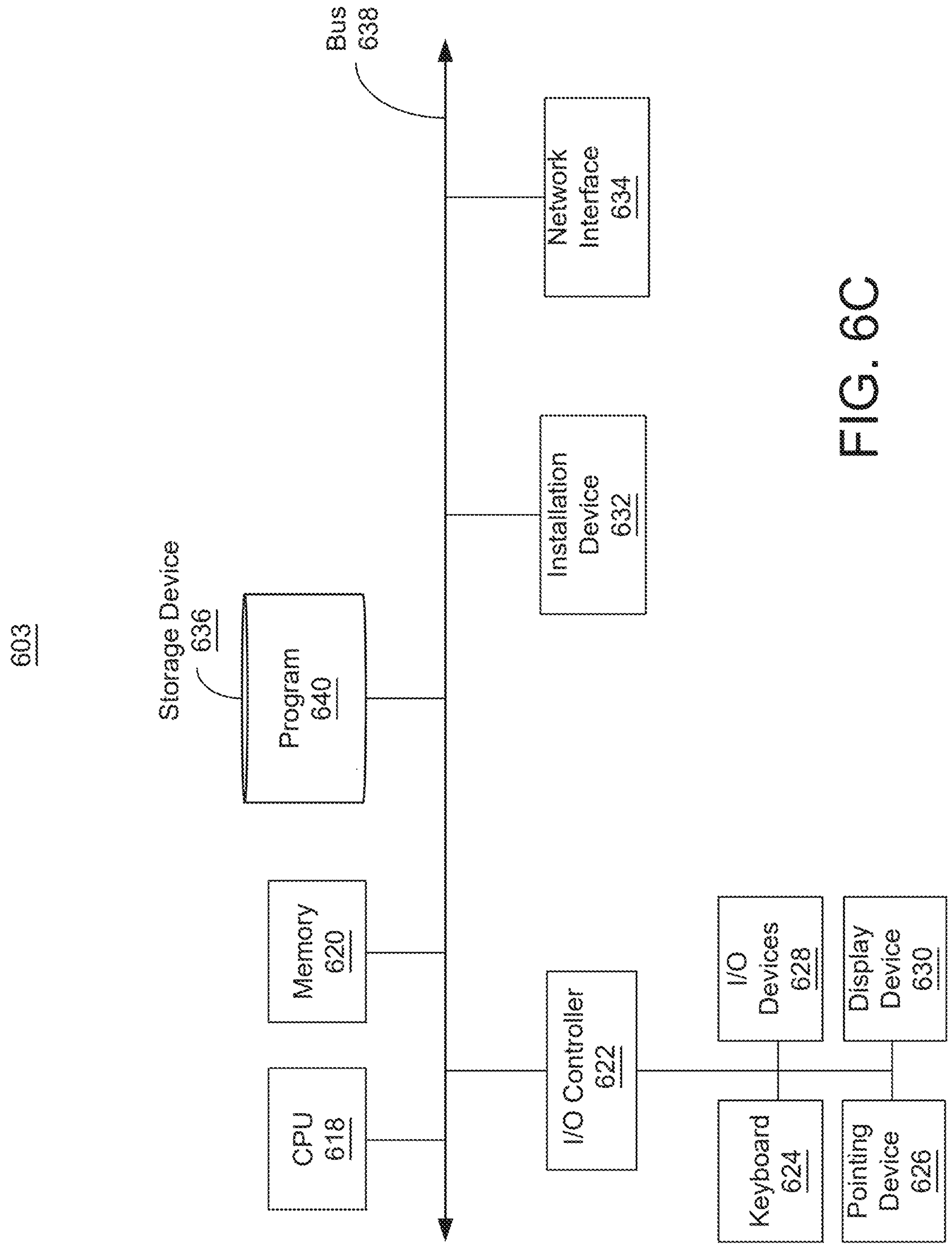
FIG. 6C is a block diagram depicting an implementation of a computing device that can be used in connection with the systems depicted in FIG. 1 and FIG. 2, and the methods and processes depicted in FIGS. 4-5, in accordance with an implementation.

FIG. 6C depicts block diagrams of a computing device 603 useful for practicing an embodiment of the client 106 or a server 602. As shown in FIG. 6C, each computing device 603 can include a central processing unit 618, and a main memory unit 620. As shown in FIG. 6C, a computing device 603 can include one or more of a storage device 636, an installation device 632, a network interface 634, an I/O controller 622, a display device 630, a keyboard 624 or a pointing device 626, e.g., a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 603 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random-access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 603. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 603. In embodiments, the computing device 603 can provide USB connections (not shown) to receive handheld USB storage devices. In embodiments, an I/O device 628 can be a bridge between the system bus 638 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 603. For example, the computing device 603 can include any type and/or form of video adapter, video card, driver, and/or library to interface, communicate, connect, or otherwise use the display devices 630. In embodiments, a video adapter can include multiple connectors to interface to multiple display devices 630.

The computing device 603 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 603 via a bus 638. Storage device 636 can be external and connect to the computing device 603 via an I/O device 630 that provides an external bus. Storage device 636 can connect to the computing device 603 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 603 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 603 can communicate with other computing devices 602 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem, or any other device suitable for interfacing the computing device 603 to any type of network capable of communication and performing the operations described herein.

A computing device 603 of the sort depicted in FIG. 6C can operate under the control of an operating system, which controls scheduling of tasks and access to system resources. The computing device 603 can be running any operating system configured for any type of computing device, including, for example, a desktop operating system, a mobile device operating system, a tablet operating system, or a smartphone operating system.

The computing device 603 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 603 has sufficient processor power and memory capacity to perform the operations described herein. In some embodiments, the computing device 603 can have different processors, operating systems, and input devices consistent with the device.

In embodiments, the status of one or more machines 106, 603 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 603 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 603 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6A, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a system. The system can include a network monitoring device. The network monitoring device can be connected to a communications network. The network device can monitor network transmitted to and from a server across the communications network. The network monitoring device can include one or more processors coupled with memory. The memory can store instructions thereon. The instructions can cause, when executed by the one or more processors, the one or more processors to retrieve, from a first database, first information of a first data packet exchange. The first information can include a first plurality of network attributes associated with the first data packet exchange. The instructions can cause the one or more processors to, responsive to a determination that there is not a match between the first information and stored exchange information in a second database, generate, using a machine learning model, a first embedding vector corresponding to the first plurality of network attributes. The instructions can cause the one or more processors to identify a second embedding vector of a second data packet exchange based on a correlation between the first embedding vector and the second embedding vector in a vector space. The second embedding vector can correspond to second information of the second data packet exchange. The second information can include a second plurality of network attributes associated with the second data packet exchange. The instructions can cause the one or more processors to, responsive to identification of the second embedding vector, determine that one or more network attributes are included in the first information and absent from the second information. The instructions can cause the one or more processors to generate an entry in the second database to include the first information and a flag to indicate the determination that the one or more network attributes are included in the first information and absent from the second information.

At least one aspect is directed to a method. The method can include retrieving, by one or more processors from a first database, first information of a first data packet exchange. The first information can include a first plurality of network attributes associated with the first data packet exchange. The method can include, responsive to a determination that there is not a match between the first information and stored exchange information in a second database, generating, by the one or more processors using a machine learning model, a first embedding vector corresponding to the first plurality of network attributes. The method can include identifying, by the one or more processors, a second embedding vector of a second data packet exchange based on a correlation between the first embedding vector and the second embedding vector in a vector space. The second embedding vector can correspond to second information of the second data packet exchange. The second information can include a second plurality of network attributes associated with the second data packet exchange. The method can include, responsive to identification of the second embedding vector, determining, by the one or more processors, that one or more network attributes are included in the first information and absent from the second information. The method can include generating, by the one or more processors, an entry in the second database to include the first information and a flag to indicate the determination that the one or more network attributes are included in the first information and absent from the second information.

At least one aspect is directed to a non-transitory computer readable storage medium. The non-transitory computer readable storage medium can include instructions stored thereon. The instructions can cause, when executed by one or more processors, the one or more processors to retrieve, from a first database, first information of a first data packet exchange. The first information can include a first plurality of network attributes associated with the first data packet exchange. The instructions can cause the one or more processors to, responsive to a determination that there is not a match between the first information and stored exchange information in a second database, generate, using a machine learning model, a first embedding vector corresponding to the first plurality of network attributes. The instructions can cause the one or more processors to identify a second embedding vector of a second data packet exchange based on a correlation between the first embedding vector and the second embedding vector in a vector space. The second embedding vector can correspond to second information of the second data packet exchange. The second information can include a second plurality of network attributes associated with the second data packet exchange. The instructions can cause the one or more processors to, responsive to identification of the second embedding vector, determine that one or more network attributes are included in the first information and absent from the second information. The instructions can cause the one or more processors to generate an entry in the second database to include the first information and a flag to indicate the determination that the one or more network attributes are included in the first information and absent from the second information.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:

a network monitoring device connected to a communications network, the network monitoring device configured to monitor network traffic transmitted to and from a server across the communications network, the network monitoring device comprising one or more processors coupled with memory, the memory storing executable instructions that, when executed by the one or more processors, cause the one or more processors to:

retrieve, from a first database, first information of a first data packet exchange, the first information including a first plurality of network attributes associated with the first data packet exchange;

convert, responsive to retrieval of the first information from the first database, the first information into a text string;

query the second database to search for a match between the text string and one or more second text strings that represent stored exchange information in the second database;

responsive to a determination that there is not the match between the text string and the one or more second text strings, generate, using a machine learning model, a first embedding vector corresponding to the text string;

determine a plurality of distances between the first embedding vector and a plurality of embedding vectors in a vector space, the plurality of embedding vectors including a second embedding vector corresponding to second information of a second data packet exchange, the second information including a second plurality of network attributes associated with the second data packet exchange, and a first distance of the plurality of distances being between the first embedding vector and the second embedding vector;

identify the second embedding vector based on the first distance being less than each other distance of the plurality of distances;

responsive to identification of the second embedding vector, determine that one or more network attributes are included in the first information and absent from the second information; and generate an entry in the second database to include the first information and a flag to indicate the determination that the one or more network attributes are included in the first information and absent from the second information.

2. The system of claim 1, wherein the instructions cause the one or more processors to:

retrieve, responsive to identification of the second embedding vector, a second entry from the second database, the second entry including the second information, and the second entry associated with the second embedding vector;

compare, responsive to retrieval of the second entry, the first information with the second information to identify one or more differences between the first information and the second information; and determine, based at least on the one or more differences between the first information and the second information, the one or more network attributes that are included in the first information and absent from the second information.

3. The system of claim 1, wherein the instructions cause the one or more processors to:

retrieve, via one or more Application Programing Interface (API) calls, the first information in a first format;

convert the first information from the first format to a second format according to a template, the first information represented as a text string with the first information in the second format;

input the text string in the second format into the machine learning model to generate the first embedding vector;

store the first embedding vector in the vector space to represent the first information in the vector space; and detect the correlation between the first embedding vector and the second embedding vector based on a distance between the first embedding vector and the second embedding vector in the vector space.

4. The system of claim 1, wherein the first plurality of network attributes include a first network attribute and a second network attribute, wherein the second plurality of network attributes include the second network attribute and a third network attribute, and wherein the instructions cause the one or more processors to:

determine that the first network attribute is absent from the second plurality of network attributes based on one or more differences between the first information and the second information.

5. The system of claim 1, wherein the instructions cause the one or more processors to:

retrieve, from the first database, third information of a third data packet exchange, the third information including a third plurality of network attributes associated with the third data packet exchange;

convert the third information from a first format to a text string;

query the second database to search for a second match between the text string and one or more text strings stored in the second database;

determine, responsive to detection of the second match, that the third information was previously observed on the communications network; and prevent, based on at least one the detection of the second match, a second entry that represents the third information from being added to the second database.

6. The system of claim 1, wherein the instructions cause the one or more processors to:

update, responsive to the determination of the one or more network attributes, a list that includes previously detected network attributes to include the one or more network attributes; and transmit, via one or more signals, the list to a computing device configured to present the list via a user interface.

7. The system of claim 1, wherein the instructions cause the one or more processors to retrieve the first information via one or more Application Programming Interface (API) calls.

8. The system of claim 1, wherein the machine learning model is a Large Language Model (LLM).

9. A method, comprising:

retrieving, by one or more processors from a first database, first information of a first data packet exchange, the first information including a first plurality of network attributes associated with the first data packet exchange;

converting, by the one or more processors responsive to retrieval of the first information from the first database, the first information into a text string;

querying, by the one or more processors, the second database to search for a match between the text string and one or more second text strings that represent stored exchange information in the second database;

responsive to a determination that there is not the match between the text string and the one or more second text strings, generating, by the one or more processors using a machine learning model, a first embedding vector corresponding to the text string;

determining, by the one or more processors, a plurality of distances between the first embedding vector and a plurality of embedding vectors in a vector space, the plurality of embedding vectors including a second embedding vector corresponding to second information of a second data packet exchange, the second information including a second plurality of network attributes associated with the second data packet exchange, and a first distance of the plurality of distances being between the first embedding vector and the second embedding vector;

identifying, by the one or more processors, the second embedding vector based on the first distance being less than each other distance of the plurality of distances;

responsive to identification of the second embedding vector, determining, by the one or more processors, that one or more network attributes are included in the first information and absent from the second information; and generating, by the one or more processors, an entry in the second database to include the first information and a flag to indicate the determination that the one or more network attributes are included in the first information and absent from the second information.

10. The method of claim 9, comprising:

retrieving, by the one or more processors responsive to identification of the second embedding vector, a second entry from the second database, the second entry including the second information, and the second entry associated with the second embedding vector;

comparing, by the one or more processors responsive to retrieval of the second entry, the first information with the second information to identify one or more differences between the first information and the second information; and determining, by the one or more processors based at least on the one or more differences between the first information and the second information, the one or more network attributes that are included in the first information and absent from the second information.

11. The method of claim 9, comprising:

retrieving, by the one or more processors via one or more Application Programing Interface (API) calls, the first information in a first format;

converting, by the one or more processors, the first information from the first format to a second format according to a template, the first information represented as a text string with the first information in the second format;

inputting, by the one or more processors, the text string in the second format into the machine learning model to generate the first embedding vector;

storing, by the one or more processors, the first embedding vector in the vector space to represent the first information in the vector space; and detecting, by the one or more processors, the correlation between the first embedding vector and the second embedding based on a distance between the first embedding vector and the second embedding vector in the vector space.

12. The method of claim 9, wherein the first plurality of network attributes include a first network attribute and a second network attribute, wherein the second plurality of network attributes include the second network attribute and a third network attribute, and comprising:

determining, by the one or more processors, that the first network attribute is absent from the second plurality of network attributes based on one or more differences between the first information and the second information.

13. The method of claim 9, comprising:

retrieving, by the one or more processors from the first database, third information of a third data packet exchange, the third information including a third plurality of network attributes associated with the third data packet exchange;

converting, by the one or more processors, the third information from a first format to a text string;

querying, by the one or more processors, the second database to search for a second match between the text string and one or more text strings stored in the second database;

determining, by the one or more processors responsive to detection of the second match, that the third information was previously observed on the communications network; and preventing, by the one or more processors based on at least one the detection of the second match, a second entry that represents the third information from being added to the second database.

14. The method of claim 9, comprising:

updating, by the one or more processors responsive to the determination of the one or more network attributes, a list that includes previously detected network attributes to include the one or more network attributes; and transmitting, by the one or more processors via one or more signals, the list to a computing device configured to present the list via a user interface.

15. A non-transitory computer readable storage medium comprising instructions stored thereon that, when executed by one or more processors, cause the one or more processors to:

retrieve, from a first database, first information of a first data packet exchange, the first information including a first plurality of network attributes associated with the first data packet exchange;

convert, responsive to retrieval of the first information from the first database, the first information into a text string;

query the second database to search for a match between the text string and one or more second text strings that represent stored exchange information in the second database;

responsive to a determination that there is not the match between the text string and the one or more second text strings, generate, using a machine learning model, a first embedding vector corresponding to the text string;

determine a plurality of distances between the first embedding vector and a plurality of embedding vectors in a vector space, the plurality of embedding vectors including a second embedding vector corresponding to second information of a second data packet exchange, the second information including a second plurality of network attributes associated with the second data packet exchange, and a first distance of the plurality of distances being between the first embedding vector and the second embedding vector;

identify the second embedding vector based on the first distance being less than each other distance of the plurality of distances;

responsive to identification of the second embedding vector, determine that one or more network attributes are included in the first information and absent from the second information; and generate an entry in the second database to include the first information and a flag to indicate the determination that the one or more network attributes are included in the first information and absent from the second information.

16. The non-transitory storage medium of claim 15, wherein the instructions cause the one or more processors to:

determine, responsive to generation of the first embedding vector, a plurality of distances between the first embedding vector and a plurality of embedding vectors in the vector space, the plurality of embedding vectors includes the second embedding vector, and a first distance of the plurality of distances is between the first embedding vector and the second embedding vector; and identify the second embedding vector based on the first distance being less than each other distance of the plurality of distances.

* * * * *